United States Patent
Dunn et al.

(10) Patent No.: US 7,437,170 B2
(45) Date of Patent: Oct. 14, 2008

(54) SYSTEM AND METHOD FOR EFFICIENT PUSH-TO-TALK COMMUNICATIONS

(75) Inventors: Doug Dunn, Chula Vista, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 778 days.

(21) Appl. No.: 11/000,214

(22) Filed: Nov. 29, 2004

(65) Prior Publication Data

US 2006/0116149 A1   Jun. 1, 2006

(51) Int. Cl.
*H04B 7/00*    (2006.01)
*H04Q 7/20*    (2006.01)

(52) U.S. Cl. .............. 455/518; 455/519; 455/3.05; 455/90.2; 455/90.3; 455/455; 455/450; 370/296; 370/277; 370/342

(58) Field of Classification Search ............ 455/518, 455/519, 3.05, 90.2, 90.3, 450, 455; 370/296, 370/276, 277, 342
See application file for complete search history.

(56) References Cited

U.S. PATENT DOCUMENTS 5,133,082 A * 7/1992 White ............... 455/701
5,887,252 A * 3/1999 Noneman .......... 455/463
6,449,491 B1 * 9/2002 Dailey ............... 455/518

FOREIGN PATENT DOCUMENTS

EP    1335522    8/2003
GB    2290196    12/1995

OTHER PUBLICATIONS

"Push-to-talk over Cellular (PoC); Architecture; PoC Release 1.0" Architecture V1.1.0, XX, XX, Aug. 2003, page Complete, XP000863835.

* cited by examiner

*Primary Examiner*—Matthew D. Anderson
*Assistant Examiner*—Shaima Q Aminzay

(57) ABSTRACT

A system and method are provided for efficient push-to-talk (PTT) communications in a cellular network of wireless telephones. The method comprises the steps of: receiving a PTT session initiation in a cellular wireless telephone network; identifying a plurality of common PTT session mobile stations in close proximity as a group; assigning a shared forward link channel to the group; and transmitting a PTT statement on the shared channel via the forward link. The shared channel can be a shared traffic channel or a common channel, such as a broadcast channel, forward common control channel, or paging channel. The shared forward link channel may be in either a circuit-switched or IP packet data system. Further, the shared forward link channel, in addition to including a shared forward fundamental channel, may also include a shared forward supplemental channel.

21 Claims, 6 Drawing Sheets

SYSTEM AND METHOD FOR EFFICIENT PUSH-TO-TALK COMMUNICATIONS

FIELD OF THE INVENTION

This invention generally relates to wireless telephone communications and, more particularly, to a system and method for efficient half-duplex, push-to-talk wireless telephone communications.

BACKGROUND OF THE INVENTION

A conventional push-to-talk (PTT) system is a half-duplex, one-to-one, or one-to-many communication system. Since PTT is useful for many applications, it has been implemented in full-duplex wireless systems such as CDMA, cdma2000, and the Global System for Mobile communication (GSM). In these full-duplex wireless communication systems, PTT is often implemented using a Voice over Internet Protocol (VoIP) application, which may be run in a circuit-switched system or in a packet data access system. Although VoIP is often associated with full-duplex voice calls over Internet Protocol, it can also be used to support a half-duplex PTT system.

In a conventional PTT call using a VoIP application over a circuit-switched network or packet data network, a calling mobile station initiates a PTT call by providing information identifying the party being called, such as a phone number, email address, identification number, or group number. The party or group being called might be selected from a group list. The base station communicates a PTT request to a PTT server.

The PTT server, in turn, sends an invitation to the called party through the called party's network. The PTT server handles PTT signaling and call control during the PTT session. Typically, the signaling between the PTT server and the PTT clients are accomplished through Session Initiation Protocol (SIP). The SIP may be transported on one or more of the physical channels supported by the clients' networks. The PTT server may be a separate physical entity or may be incorporated within part of a network. The server may act as an intermediary between networks or between base stations. The called party is paged and responds to the page, indicating that it is available to take a PTT communication. As used herein, PTT communications are generically intended to describe half-duplex communications, which might alternately be referred to as Press-to-talk over Cellular (PoC), or some other nomenclature.

In one example, the calling mobile station initiates the PTT session by sending a short data burst (SDB) message to the base station, to invite the party or parties being called. A SDB message is a packet sent over a shared or common channel, as opposed to a traffic channel. The base station sends an acknowledgement (ACK) message to the calling mobile to indicate receipt of the SDB message. When the ACK message is received, the calling mobile sends an origination message requesting that a traffic channel be assigned to handle the PTT communication. The PTT server, after receiving the invitation notification, will invite the called party to the PTT session by sending an invitation over a shared common channel. The called party will respond to this invitation and request a traffic channel for this PTU session.

Once the call is established, the communications are half-duplex in nature, similar to a 2-way radio communication where only one user transmits at a time, and all the other users receive (listen). Thus, in a PTT call, there are voice packets communicated on a reverse link traffic channel established between the calling party (first mobile) and a base station. Simultaneously, a forward link traffic channel communicates packets between a base station and the called party (second mobile). When the second mobile has the floor, a reverse link is established between the second mobile and the base station, and a forward link traffic channel established to the first mobile.

Although originally designed for circuit-switched voice communications, wireless telephone networks conventionally support two-way packet-switched packetized data services, such as browsing instant messaging and email. Wireless data calls are tailored to support conventional Internet Protocol (IP) packet-based service applications, and may include retransmission features. Although a PTT session can be enabled using circuit-switch voice channels, PTT applications typically utilize IP packet transport as an alternative to circuit-switched communications. An IP-based packet network can be used to support PTT communications. For packet data services, an access network (AN) acts as a base station.

A PTT session is characterized by an end-to-end communication capability for one-to-one or one-to-many half-duplex calls over a wireless network. The network may be either IP-based or non-IP based. Since PTT calls are half-duplex calls, only the user that has the floor (talking) needs a dedicated channel in the reverse link to support user data (or packets). The other users in the PTT group need only dedicated channels in the forward link to receive the information.

In many circumstances, such as in a business conference call scenario, several users may be participating in the same PTT session. Other one-to many scenarios include a group of friends chatting, trying to determine a meeting place for example, or a foreman giving directions to a group of workman situated at various locations in a worksite. In these situations a number of listening mobiles are simultaneously receiving the exact same transmission on a corresponding number of independent traffic channels. Conventionally, the management of the PTT sessions is handled irrespective of the location of the users in the PTT group. In a High Rate Packet Data (HRPD) system, when a PTT user wants to speak (i.e. push-to-talk), the access terminal (AT) of the PTT user uploads the voice packets to access network (AN). Once the PTT session manager obtains the voice packets, it prompts the AN to deliver the voice packets to all the other PTT users in the group. The AN treats all the users in the group as individual data users in the network. The AN delivers the packets to the receiving PTT users as resources allow, based on the status of the scheduler in the network. More advanced implementations of the network take into account the urgency of the PTT users and the AN delivers the voice packets to the users with as little delay as possible through the use of a Quality of Service (QoS), but the delivery is still provided on a per user basis. Accordingly, there remains a strong need in the art for a system and method for efficient resource allocation for PTT communications.

SUMMARY OF THE INVENTION

A system and method are described that make the management of wireless telephone traffic channels more efficient, when it can be determined that a plurality of mobile stations engaged in a PTT session, are co-located in close proximity, e.g., in a common sector. In this situation, the base station (BS) serving the sector transmits the PTT session forward link transmission on a shared channel. That is, instead of using several independent traffic channels to transmit the exact same PTT communication, the BS establishes either a shared traffic channel or a broadcast traffic to service the PTT group in the forward link.

Accordingly, a method is provided for efficient PTT communications in a cellular network of wireless telephones. The method comprises the steps of: receiving a PTT session initiation; identifying a plurality of common PTT session mobile stations in close proximity as a group; assigning a shared forward link channel to the group; and transmitting a PTT statement on the shared channel via the forward link.

As mentioned above, the shared channel can be a shared traffic channel or a common channel, such as a broadcast channel, forward common control channel, or paging channel. In the context of a CDMA network, the shared channels might be a forward traffic channel or a forward common channel, such as a Broadcast Control Channel, Forward Common Control Channel, or Paging Channel. In one aspect, the shared forward link channel is associated with either a circuit-switched or IP packet data system type. Further, the shared forward link channel, in addition to providing a shared forward fundamental channel, may also include a shared forward supplemental channel. The supplemental channel is useful in situations where the fundamental channel has a low data rate and is encumbered with a high overhead, or in situations where other media besides voice is being communicated.

Some examples of possible networks in which the method may be employed include code division multiple access (CDMA), cdma2000, Universal Mobile Telecommunications System (UMTS), and Global System for Mobile communications (GSM). For example, in a CDMA network, the shared forward link channel may be created by assigning a channel to the PTT group with a shared Walsh code and a shared Public Long Code Mask (PLCM). The shared code information may be established as a result of a preliminary communication such as a Short Message Service (SMS), channel assignment message, or Short Data Burst (SDB) message. In a GSM wireless telephone network, the shared forward link channel may be a common time slot that is assigned to the PTT group.

In another aspect of the method, if it is known that a relatively large number of mobiles in the group are engaged in a common PTT session, that information can be used to make sector resources more readily available to non-PTT users. For example, if a relatively large number of mobiles in the sector are engaged in a common PTT session, then higher data rates can be permitted in the forward link to requesting mobile stations, since PTT users typically require only low data rates and fewer resources from the base station.

Additional details of the above-described method and wireless telephone system for efficient PTT communications are provided below.

DETAILED DESCRIPTION

Figure 1:
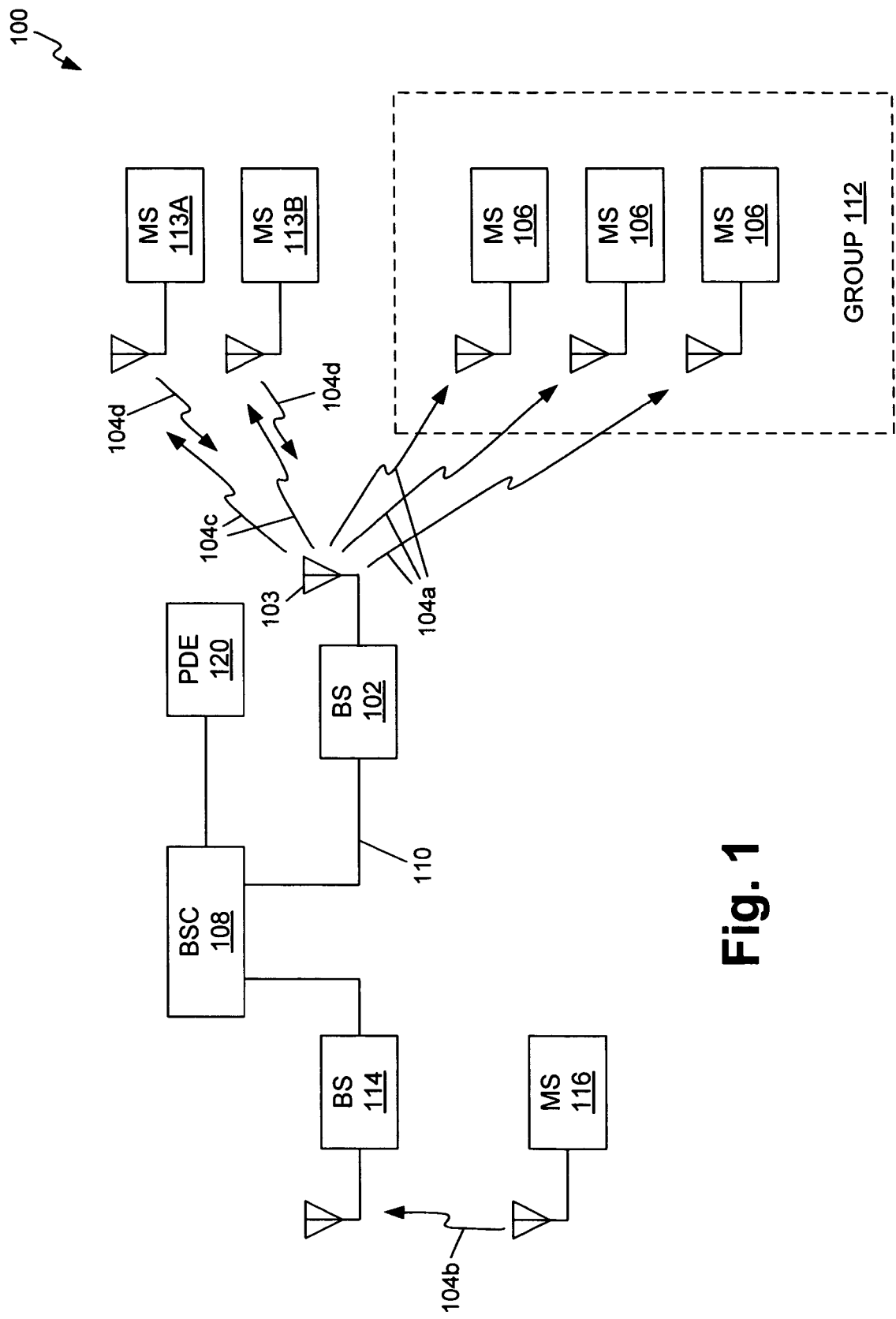
FIG. 1 is a schematic block diagram of a system for efficient push-to-talk (PTT) communications in a cellular network of wireless telephones.

FIG. 1 is a schematic block diagram of an exemplary system for efficient push-to-talk (PTT) communications in a cellular network of wireless telephones according to one embodiment. System 100 comprises base station (BS) 102 having air interface 103, to support a common PTT session with a plurality of mobile stations (MS) 106. The air interface includes the elements of an antenna and transceiver. Forward link communications are represented by designators 104a and 104c and reverse link communications are represented by designators 104b and 104d. Base station controller (BSC) 108 has an interface on line 110 with BS 102. BSC 108 identifies a plurality of common PTT session mobile stations 106 in close proximity (with each other) as group 112, and sends a PTT shared channel message to BS 102. In the present disclosure, Group 112 is also referred to as a "common PTT group." In one aspect, the mobile stations 106 are all in the same sector. However, in special circumstances the BS may support the common PTT session with some mobile stations in a different sector, if those units are closely located to units in the sector served by BS 102. For example, the BS may retain communications with mobile stations in a PTT session, even though those units have been handed-off to a different sector. As explained below, members of the group of mobile stations may potentially be in different sectors in some circumstances.

BS 102 assigns a shared forward link channel to group 112, and transmits a PTT statement on the shared channel via the forward link. As used herein, a "PTT statement" is intended to be a single PTT transmission, or the information that is transmitted by the PTT "talker" for the entire length of time that the PTT button is engaged. It is noted that mobile stations 113a and 113b are in the sector being served by BS 102, but are not participating in the PTT session with group 112. On the other hand, mobile station 116 is located in a sector served by base station 114 and is participating in the same the PTT session as the mobile stations in group 112. Typically, a wireless network includes a number of connected BSs. For simplicity, second BS 114 is shown connected to BSC 108. As shown, mobile station 116 is the "talking" PTT mobile using the reverse link 104b. Mobile stations 106 are listening, using forward link 104a.

The terms BS and BSC are intended to be generic, as system 100 can be used in CDMA, cdma2000, UMTS, FLASH-OFDM, IEEE 802.18, IEEE 802.20, and GSM networks. Generally, the terms BS, BSC, and mobiles or mobile stations (MS) are more applicable to circuit-switched networks. In 3G wireless data networks, the BS might be referred to as an access network (AN), the BSC is more properly called a core network (CN) packet data service network (PDSN), or IP Multimedia Subsystem (IMS), and the MS is called an access terminal (AT).

In another aspect, a Position Determination Entity (PDE) 120 receives location data from mobile stations, relayed to BSC 108 via BS 102. For example, the mobile may be equipped with Global Positioning Satellite (GPS) receivers and the receipt of location data may be a step in other conventional processes. Alternately, the mobile's position information may be derived as a result of a position calculation. However the location data is received, BSC 108 notes the location of common PTT session mobile stations and identifies mobile stations located in close proximity, or co-located in a common sector as group 112. Note, in some circumstances, such as in a soft-handoff scenario, mobile stations that are technically outside the sector may be included as part of group 112. Likewise, mobiles technically within the sector may be excluded from the group.

Typically, the sector information is sufficient to determine which users should be grouped together. The base station can obtain this information easily. The mobile stations always report the received pilot strength of the sector back to the base station. This can be used for sector identification as well as handoff scenarios. However, if position information is also available, the base station can optionally use this information to fine-tune the group. For example, if a mobile station is at the edge of a sector, the base station may not want to include this mobile station in the group for this sector, since it's likely that this mobile station will transition to another sector very quickly (i.e. handoff to another sector). Also, location may assist the base station in tracking or predicting the sector(s) to which a mobile station is heading. Thus, the position information may be useful in establishing a mobile station in a neighboring group.

BS 102 may assign a shared forward link channel that is either a shared traffic channel, or a common channel. Note, the details of traffic and common channels vary between networks. However in general, a traffic channel is understood to be a channel that is conventionally assigned to a single mobile station, while a common channel is understood to be a channel that can communicate with a plurality of mobiles. Some examples of common channels that may be adapted for use as a shared PTT forward link channel include a broadcast channel, forward broadcast control channel, forward common control channel, or a paging channel. In the context of a CDMA network, the shared channels might be a forward traffic channel or a forward common channel, such as a Broadcast Control Channel, Forward Common Control Channel, or Paging Channel.

In another aspect, the shared forward link channel is a channel in either circuit-switched or Internet Protocol (IP) packet data system. Further, BS 102 may assign a shared forward fundamental channel and a shared forward supplemental channel. The supplemental channel may be used if the fundamental channel has a low data rate, or a low effective data rate due to high overhead. Then, data can be distributed over both channels. Alternately, the, supplemental channel can be used to distribute media different than voice. For example, the supplemental channel may be high data rate video that supports voice commentary in the fundamental channel. Further, in some aspects, the fundamental channel may be circuit-switched, while the supplemental channel may be IP packet data.

In a CDMA wireless telephone network, BS 102 may assign a channel to group 112 with a shared Walsh code and a shared Public Long Code Mask (PLCM). These shared codes can be used to support either a shared traffic channel or a PTT group broadcast channel. Since there are a relatively few number of Walsh codes, the assignment of a shared PLCM is a greater concern. As is known in the art, the mobile stations all use the same lengthy PLCM. The PLCM can be considered a shared code if the code sequence, or starting register can be signaled to the mobiles by the BS. In one aspect, BS 102 assigns a shared PLCM to group 112 by sending a preliminary communication such as a SMS, channel assignment message, or SDB message.

In another aspect, BS 102 may send a preliminary communication, such as a SMS or SDB, requesting that mobile stations 106 register for a broadcast channel/multicast channel (BCMC) shared traffic channel PTT session. In a different aspect, BS 102 transmits a PTT service parameters message containing information necessary for the mobile stations to join the PTT session, such as a BCMC Service Parameters Message. The mobile stations in the sector respond with Registration Messages to the BSC 102 via the reverse link 104*b*. BSC 108 identifies the mobile stations sending the Registration Message as group 112. Then, BS 102 assigns group 112 a BCMC traffic channel as the shared forward link channel. It should be understood that BCMC channels are conventionally only used as a "push" forward link service, and that a PTT session using BCMC still requires the use of a traffic channel on the reverse link from the "talking" mobile.

In a GSM wireless network, the BS may assign group 112 a common time slot as a shared forward link channel. In addition to assigning the same time slot, BS 102 may assign the group a common frequency. Once again, the common time slot/common frequency may either be a shared traffic channel or a special form of broadcast channel.

Regardless of the wireless network type, the use of broadcast and shared traffic channels gives rise to the question of security, as it would be preferable if mobiles that are not participating in the PTT session could be excluded from accessing the shared channel. Thus, in one aspect, BS 102 encrypts the PTT statement transmission sent via forward link 104*a*. This encryption steps occurs in addition to the conventional authentication processes. For example, BS 102 may send a decryption key to the mobile stations in group 112 in a PTT session initiation message, for decrypting the PTT statement at an application level. The PTT session initiation message may be a form of SMS or SDB message. In another aspect, where BS 102 is part of a CDMA wireless telephone network, the BS encrypts the PTT statement using a spreading code. For example, encryption is based upon efforts to keep the shared Walsh and PLCM codes from mobiles in the sector outside PTT group 112.

In another aspect, encryption/security can also be handled with the R-UIM, SIM, or USIM as appropriate. Further, an application can be used that calls the security algorithm. This additional application may be part of a subscription to a group.

The use of a shared forward link channel for PTT forward link communications may trigger the efficiently distribution of other network resources in the sector. For example, BSC 108 may compare the number of members in group 112 to the overall number of mobile stations using forward link traffic channels in the sector, and generate a PTT forward call ratio. As shown in FIG. 1, the call ratio would be 3/5. This ratio is likely to be unrealistically high in practice and is only used for illustration. BSC 108 compares the PTT forward call ratio to a threshold, and if the PTT forward call ratio exceeds the threshold, the BSC sends a forward link rate update message to BS 102. In this example, if the threshold is set to 0.5, then BSC 108 sends the forward link rate update message. Then, the BS permits higher data rates in the forward link to requesting mobile stations. For example, BS 102 could give higher data rate links to the mobiles 113*a* and 113*b* if they were requested. In summary, this decision can be made based upon the fact that it is known that a relatively large number of mobile stations in the sector (group 112) will not be requesting a high data rate channel. There could routinely be a high number of PTT session users in a single sector. For example, an aircraft maintenance team could have 20+ members working in one sector. The use of a ratio is at least one level up from the criteria normally used by a BS to make a decision. If there are 5 PTT session users and 3 non-session users, and the 5 can be combined, then the BS can consider there are effectively 4 users in the sector. Only 3 can be expected to make requests for higher data rates. The PTT users might be assigned a fixed rate. In a HRPD scenario, the 5 users all get scheduled into one slot, only the other 3 users need to be scheduled.

As an alternate approach for providing higher data rates for non-PTU users in the sector, the base station can monitor a threshold based on a figure of merit such as the total reserve transmit power available at the base station. If several PTT users share the same traffic or common channel in the sector, it is likely that the base station will have more reserve transmit power for the non-PTT users in the sector. The reserve power can be used to provide higher data rate for the non-PTT users.

Likewise, BSC 108 can compare the number of members in group 112 to the overall number of mobile stations using reverse link traffic channels in the sector, and generate a PTT reverse call ratio. BSC 108 compares the PTT reverse call ratio to a threshold, and if the PTT reverse call ratio exceeds the threshold, the BSC sends a reverse link rate update message to BS 102. BS 102, then, permits higher data rates in the reverse link to requesting mobile stations. In a HRPD network, where the BS is more properly termed an access network, AN 102 sets the reverse activity bit (RAB) to zero. This permits at least a subset of mobiles seeking a higher data rate to have a higher probability of receiving a higher rate data link.

Figure 2:
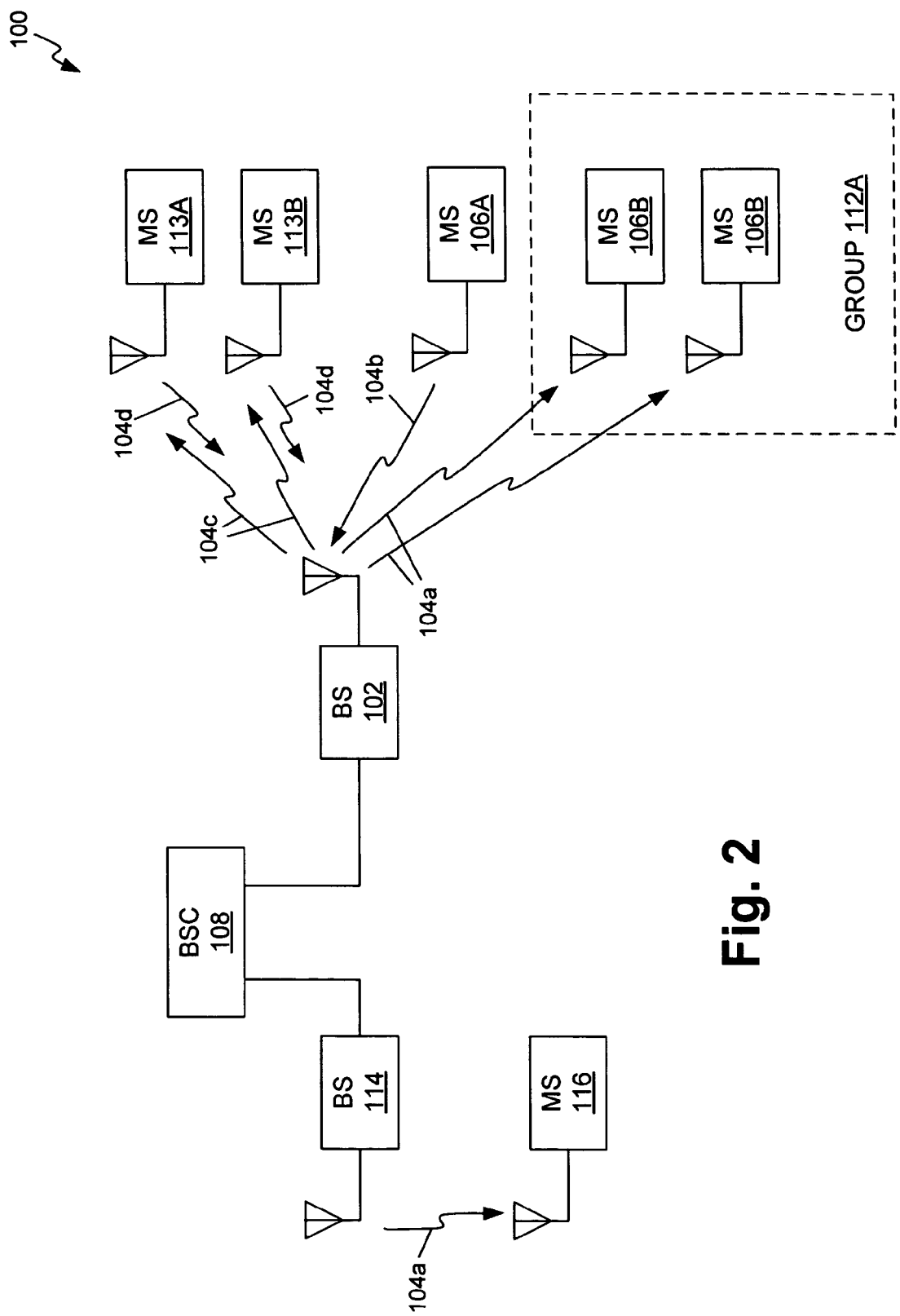
FIG. 2 is the schematic block diagram of FIG. 1 illustrating another aspect of the efficient PTT system.

FIG. 2 is the schematic block diagram of FIG. 1 illustrating another aspect of efficient PTT system 100. Here, following the PTT statement transmission, BS 102 receives a new PTT statement from a mobile station in the (previous) group via the reverse link. The mobile station is unit 106a, which was part of PTT group 112 of FIG. 1. BSC 108 re-identifies a plurality of common PTT session mobile stations in the sector as the (new) group. In this example, mobile stations 106b are now group 112a. BS 102 assigns a shared forward link channel to the re-identified group 112a and transmits the new PTT statement on the shared channel via forward link 104a.

Figure 6:
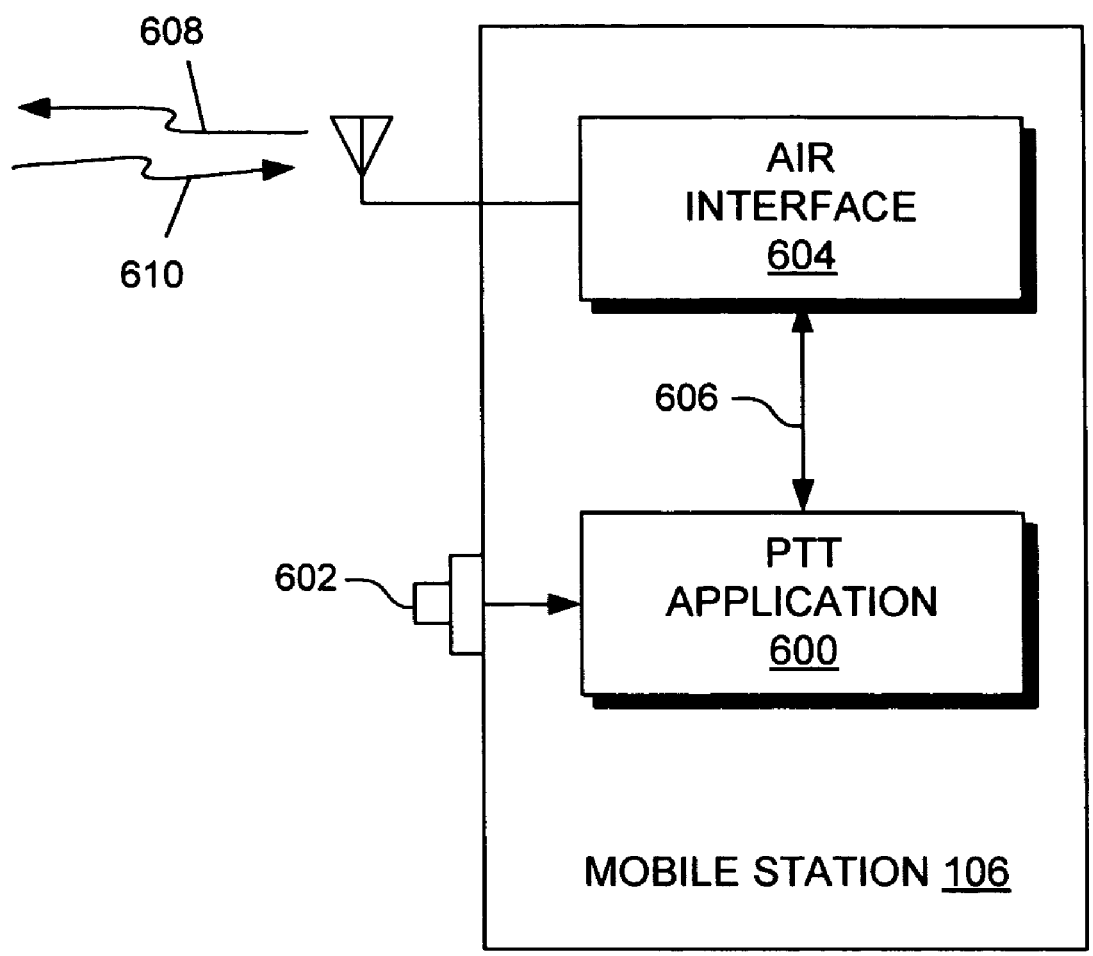
FIG. 6 is a schematic block of the system for efficient PTT communications, from the perspective of the mobile station of FIG. 1.

FIG. 6 is a schematic block of the system for efficient PTT communications, from the perspective of mobile station 106 of FIG. 1. Considering both FIGS. 1 and 6, a plurality of mobile stations 106 are located in close proximity and engaged in a common PTT session. As noted above, these mobiles constitute group 112. Typically, all the mobile stations in the group are co-located in the same sector. Each mobile station 106 includes PTT application 600 with PTT button interface 602 to send a transmission when engaged, and to receive a transmission when not engaged. For example, button 602 can be a dedicated button specifically for use with PTT. Alternately, button 602 may be a predefined soft key or multifunction key on a phone's keypad such as the "send" key. Air interface 604, shown as a combination of antenna and transceiver, has a connection on line 606 so as to be responsive to the PTT application. Air interface 604 sends a half-duplex transmission via reverse link 608, when button 602 is pushed, and receives a half-duplex transmission on shared forward link channel 610, when the button is not pushed. PTT application 602 processes the information received on shared forward link channel 610 as a common PTT statement.

Mobile station air interface 604 receives shared forward link channel 610 as a shared traffic channel or a common channel. If a common channel is received, it may be a broadcast channel, forward common control channel, forward broadcast control channel, or paging channel, for example. Further, the shared forward link channel 610 can be used in either a circuit-switched or an IP packet data system. In addition to receiving a shared forward fundamental channel, mobile station air interface 610 may also receive a shared forward supplemental channel.

If mobile station 106 is a member of a CDMA wireless telephone network, air interface 610 may receive channel 610 with a shared Walsh code and a shared PLCM, for example. In one aspect, the air interface 610 receives the shared PLCM in a preliminary communication such as a SMS, channel assignment message, or SDB message. In another aspect, the mobile station PTT application 602 may initiate a preliminary communication requesting register for a BCMC shared traffic channel PTT session. Alternately, if mobile station 106 is a member of a GSM wireless telephone network, air interface 610 receives a common time slot as shared forward link channel 610.

Functional Description

The above-described system has several advantages over conventional PTT communications. For example, the same statement (voice packet) may be sent to all the PTT users of a common group, in the same sector, without duplicating packets using multiple dedicated channels. In one aspect the same PLCM is used for all the mobiles in that group. In another aspect, a PTT statement may be sent to all the users in the same sector via broadcast message. Either approach can be made applicable to HRPD and cdma2000 1× systems.

If the access network can associate the N users belonging to the same PTT session, the network should be able to schedule the PTU listeners as closely as possible to reduce potential delay in sending voice packets. This type of management can be performed in every sector.

The degree of benefit is greatest when users are concentrated on one cell. The larger the group, the more significant the benefit. Further, the PTT system has application to multiple groups and multiple cells.

As noted above, the PTT system can be used to vary the RAB in a HRPD network. RAB is used to manage the reverse link load. When several PTT users are listening in a particular sector, RAB can be set to 0, since there is little activity. If the PTT users are listeners, and not transmitting data, then the other users in the sector should be able to use these resources. Further, the network resources can be allocated based upon the assumption that the PTT listeners typically only require a low data rate channel, such as 9.6 kbps.

Figure 3:
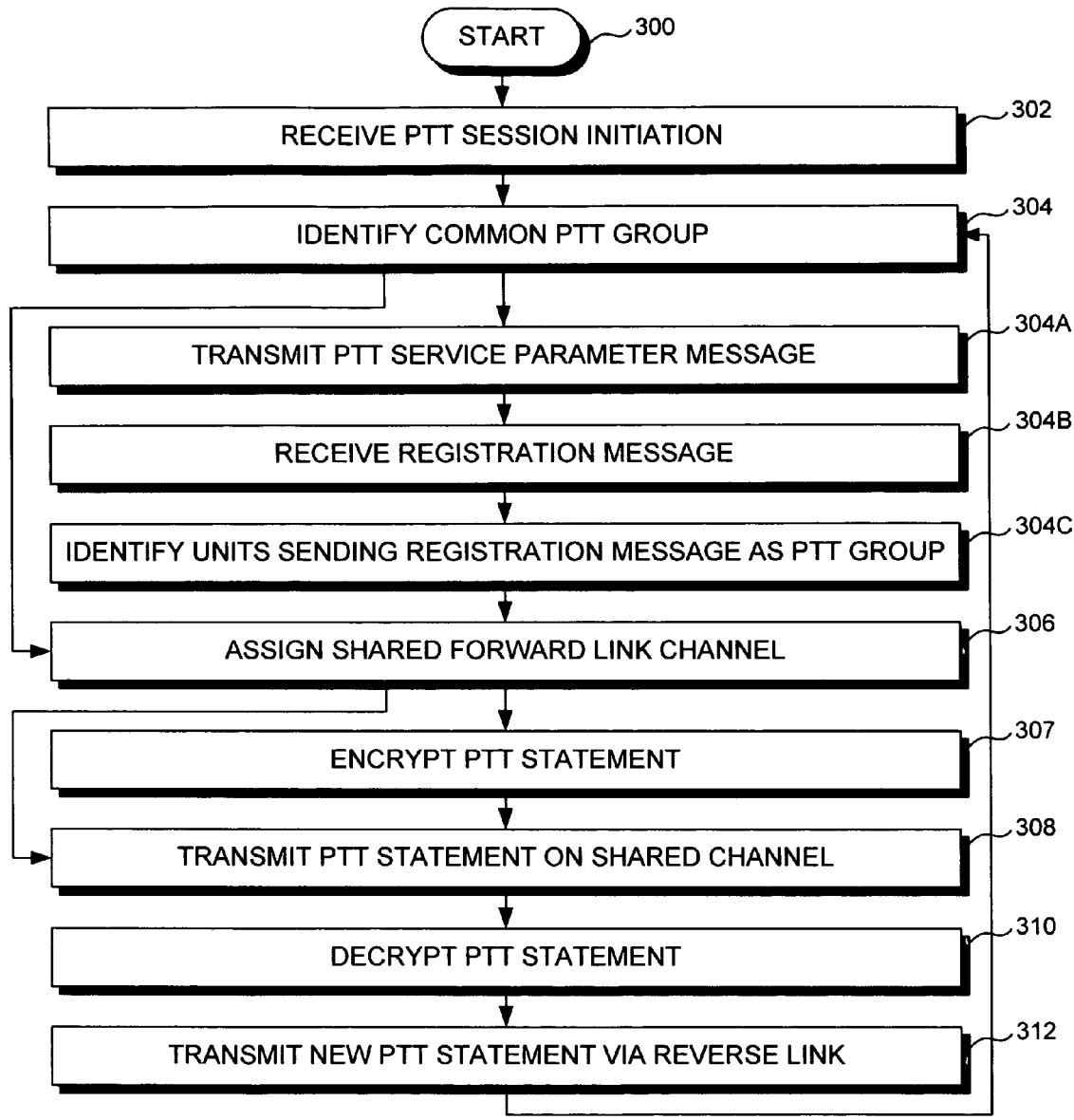
FIG. 3 is a flowchart illustrating a method for efficient PTT communications in a cellular network of wireless telephones.

FIG. 3 is a flowchart illustrating a method for efficient PTT communications in a cellular network of wireless telephones according to one embodiment. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300.

Step 302 receives a PTT session initiation originated by a mobile station in a cellular wireless telephone network. At step 304, a plurality of common PTT session mobile stations in close proximity are identified. For example, the group mobile stations may all be in the same sector. By way of illustration, the base station is able to track and record the location of common PTT session mobile stations (e.g., MS 106 in FIG. 1 are part of a common PTT session). Then the base station is able to identify the mobile stations co-located in the common sector as the group (e.g., MS 106 co-located are identified as group 112 in FIG. 1).

According to one particular embodiment, identifying the plurality of common PTT session mobile stations in the sector as the group in Step 304 may include substeps 304A through 304C. In Step 304A the plurality of mobile stations in the sector receive a PTT service parameters message transmitted by the base station, such as a BCMC Service Parameters Message via the forward link. In Step 304B the plurality of receiving mobile stations send a registration message which is received by the base station via the reverse link. At step 304C, the mobile stations sending the registration message is identified as the group. Then, at Step 306, a BCMC traffic channel is assigned to the group as the shared forward link channel.

Step 306 assigns a shared forward link channel to the group. Step 308 transmits a PTT statement on the shared channel via the forward link.

Assigning the shared forward link channel to the group in Step 306 typically includes assigning a shared traffic channel or a common channel. The common channel can be a broadcast channel or control channel, as discussed above. In certain embodiments, Step 306 involves assigning both a shared forward fundamental channel and a shared forward supplemental channel.

In a CDMA system, for example, Step 306 may involve assigning a channel to the group with a shared Walsh code and a shared Public Long Code Mask (PLCM). For example, Step 306 may assign the shared PLCM to the group by sending a preliminary communication, such as a SMS, channel assignment message, or SDB. In another example, the preliminary communication may be a request for mobile stations to register for the BCMC shared traffic channel PTT session. The preliminary communication may also request a BCMC-like shared channel PTT session.

In GSM wireless telephone network, for example, Step 306 may involve assigning a common time slot to the group as the shared forward link channel. In another embodiments, Step 306 involves assigning a common carrier frequency, as well as a common time slot.

Referring again to FIG. 3, Step 307 involves encrypting the PTT statement. In one example, a decryption key is sent to the group in a PTT session initiation message. In Step 310 the mobile stations in the group use the key to decrypt the PTT statement at an application level. Alternately, Step 302 receives the PTT session initiation in a CDMA wireless telephone network. Then, in Step 307 the PTT statement is encrypted using a spreading code. Note, decryption may also be performed at the application level in a CDMA network.

Following the PTT statement transmission (Step 308), in Step 312 a mobile station from the group transmits a new PTT statement via the reverse link. Then, Step 304 re-identifies a plurality of common PTT session mobile stations in the sector as the group. Step 306 assigns a shared forward link channel to the re-identified group, and Step 308 transmits the new PTT statement on the shared channel via the forward link.

Figure 4:
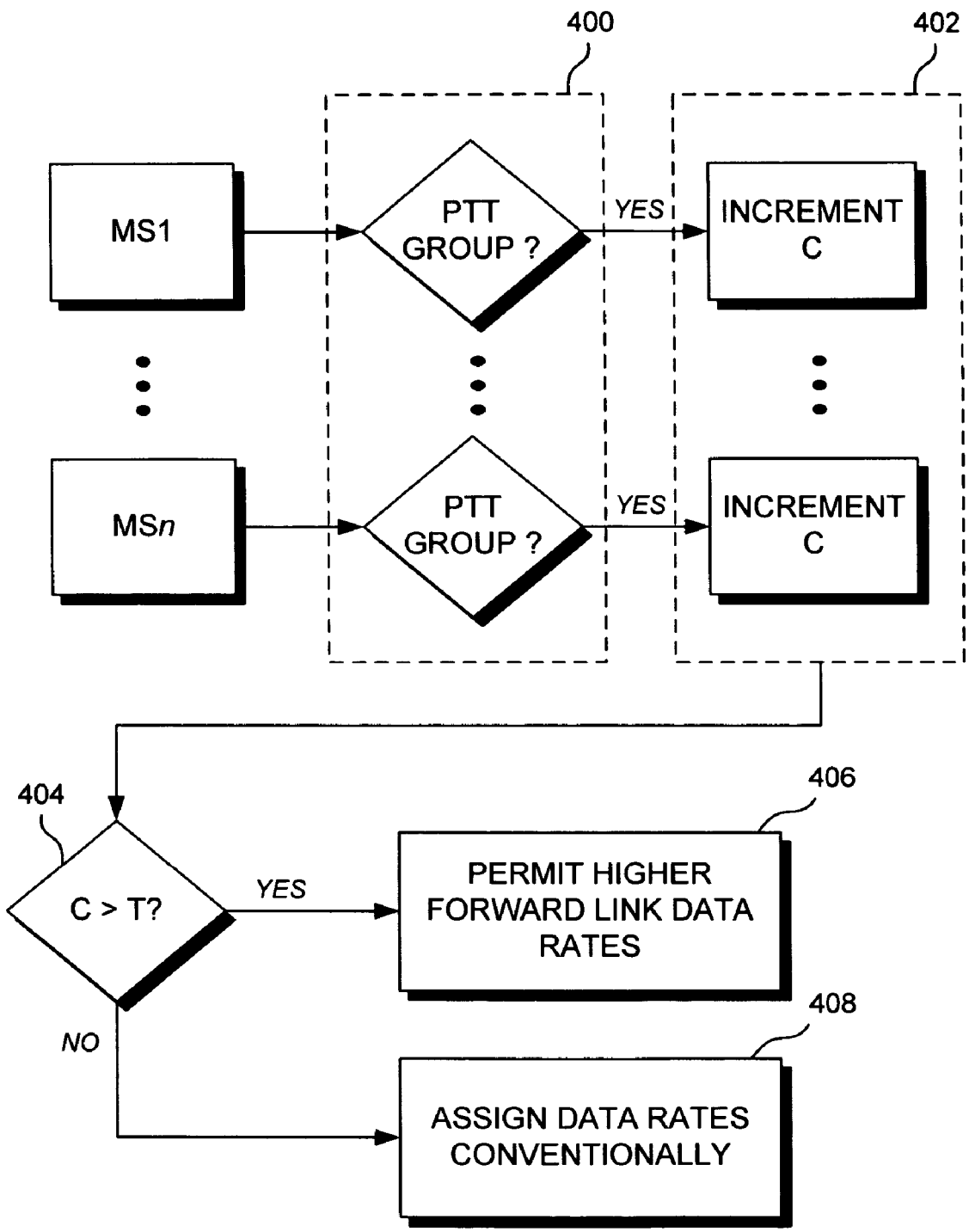
FIG. 4 is a flowchart illustrating a method for improving forward link management in a network using the efficient PTT method of FIG. 3.

FIG. 4 is a flowchart illustrating a method for improving forward link management in a network using the efficient PTT method of FIG. 3. Step 400 determines if mobile stations are part of the PTT group. Step 402 compares the number of members in the group to the overall number of mobile stations using forward link traffic channels in the sector, generating a PTT forward call ratio. Alternately, in a simplified case as shown, the number of members in the group ("C") is counted. Step 404 compares the PTT forward call ratio (or members "C") to a threshold. In Step 406, if the PTT forward call ratio (or count "C") exceeds the threshold, higher data rates are permitted in the forward link to requesting mobile stations in the sector served by the base station, thereby making sector resources more readily available to non-PTT users. As discussed above, if a relatively large number of mobiles in the sector are engaged in a common PTT session, then higher data rates can be permitted in the forward link to requesting mobile stations, since PTT users typically require only low data rates and fewer resources from the base station. If the ratio (or "C") is less than the threshold, Step 408 assigns data rates in a network-conventional manner.

Figure 5:
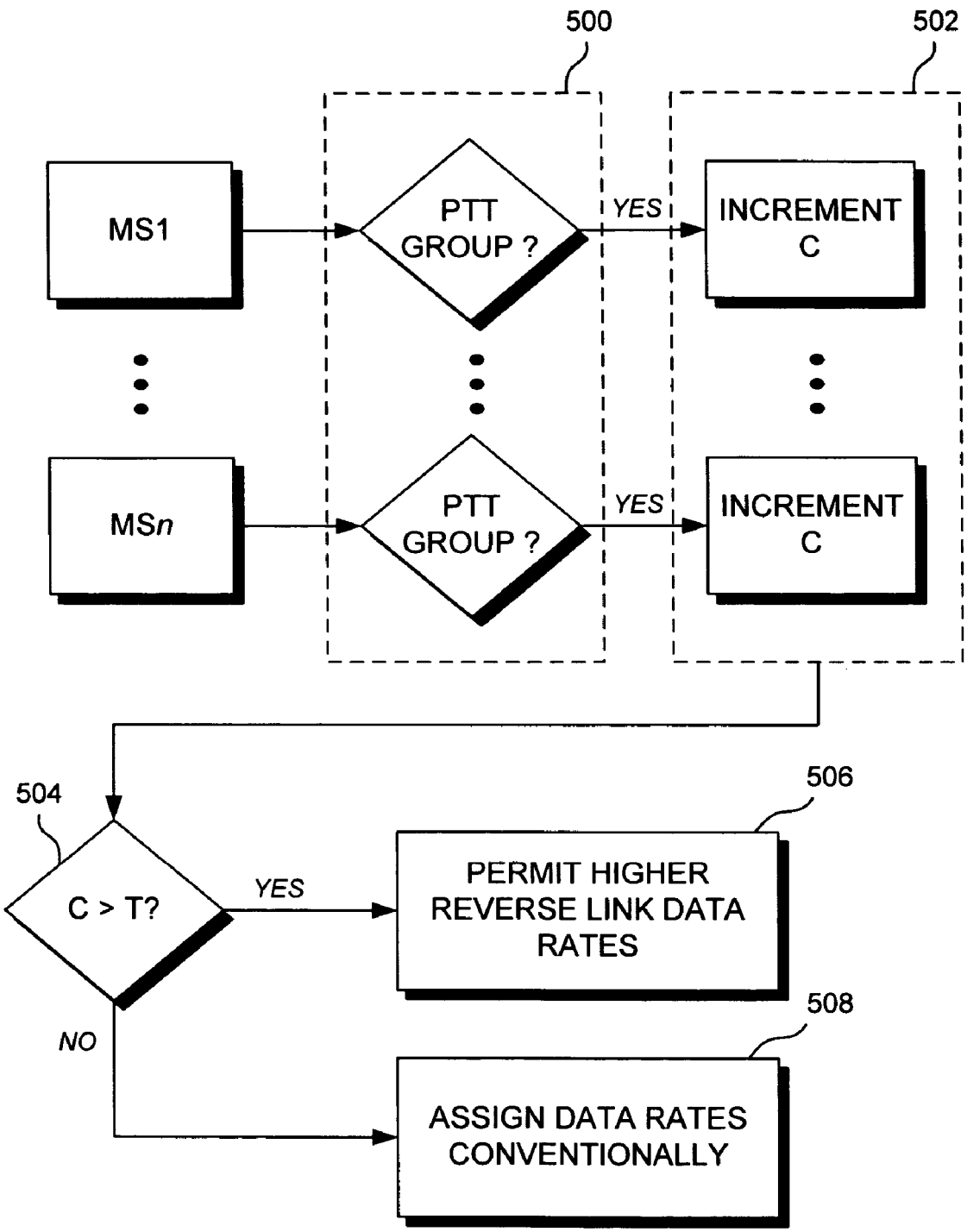
FIG. 5 is a flowchart illustrating a method for improving reverse link management in a network using the efficient PTT method of FIG. 3.

FIG. 5 is a flowchart illustrating a method for improving reverse link management in a network using the efficient PTT method of FIG. 3. Step 500 determines if mobile stations are members of the PTT group. Step 502 compares the number of members in the group to the overall number of mobile stations using reverse link traffic channels in the sector, generating a PTT reverse call ratio. Alternately, in a simplified case as shown, the number of members in the group ("C") is counted. Step 504 compares the PTT reverse call ratio (or members "C") to a threshold. In Step 506, if the PTT reverse call ratio (or count "C") exceeds the threshold, higher data rates are permitted in the reverse link to requesting mobile stations in the sector served by the base station. If the ratio (or "C") is less than the threshold, Step 508 assigns data rates in a network-conventional manner. In one aspect, the PTT session is initiated via a HRPD wireless telephone network. Then, Step 506 permits higher data rates in the reverse link to requesting mobile stations by setting a reverse activity bit (RAB) to zero.

Thus, a system and method for efficient PTT communications have been described. From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

We claim:

1. A method comprising:
  receiving a cellular wireless telephone network PTT session initiation;
  identifying a plurality of common PTT session mobile stations in close proximity as a common PTT group in response to the cellular wireless telephone network PTT session initiation;
  assigning a shared forward link channel to the common PTT group;
  transmitting a PTT statement on the shared channel via the shared forward link channel;
  comparing a number of members in the common PTT group to an overall number of mobile stations using forward link traffic channels in a sector to establish a PTT forward call ratio;
  comparing the PTT forward call ratio to a threshold; and
  if the PTT forward call ratio exceeds the threshold, permitting higher data rates in the forward link to requesting mobile stations in the sector.

2. The method of claim 1 wherein identifying the plurality of common PTT session mobile stations in close proximity comprises identifying the plurality of common PPT session mobile stations in a sector.

3. The method of claim 1 wherein assigning the shared forward link channel comprises assigning at least one of a shared traffic channel and a common channel.

4. The method of claim 3 wherein assigning the common channel comprises assigning at least one of a broadcast channel, a control channel, and a paging channel.

5. The method of claim 1 wherein assigning the shared forward link channel comprises assigning a shared forward fundamental channel and a shared forward supplemental channel.

6. The method of claim 1 wherein assigning the shared forward link channel comprises assigning a shared Walsh code and a shared Public Long Code Mask (PLCM).

7. The method of claim 1 wherein identifying the plurality of common PTT session mobile stations comprises:
transmitting a PTT service parameters message;
receiving a Registration from a plurality of registering mobile stations; and
identifying the registering mobile stations as the plurality of common PTT session mobile stations.

8. The method of claim 1 wherein assigning the shared forward link channel comprises assigning at least one of a common time slot and a common frequency.

9. The method of claim 1 further comprising encrypting the PTT statement.

10. The method of claim 1 further comprising:
comparing a number of members in the common PTT group to an overall number of mobile stations using reverse link traffic channels in a sector to establish a PTT reverse call ratio;
comparing the PTT reverse call ratio to a threshold; and
if the PTT reverse call ratio exceeds the threshold, permitting higher data rates in the reverse link to requesting mobile stations in the sector.

11. The method of claim 10 wherein permitting higher data rates in the reverse link comprises selling a Reverse Activity Bit (RAB) to zero.

12. A mobile station operating in cellular network including a base station, the mobile station comprising:
a transceiver configured to:
receive a shared forward link channel assignment assigning a shared forward link channel to the mobile station and at least one other mobile station based, at least partially, on the proximity of the mobile station to the at least one other mobile station;
receive a PTT statement on the shared forward link channel transmitted from the base station and received by the at least one other mobile station.

13. The mobile station of claim 12 wherein the shared forward link channel assignment is transmitted by the base station to the at least one other mobile station.

14. The mobile station of claim 12 wherein the shared forward link channel comprises at least one of a shared traffic channel and a common channel.

15. The mobile station of claim 14 wherein the common channel comprises at least one of a broadcast channel, a control channel, and a paging channel.

16. The mobile station of claim 12 wherein the shared forward link channel comprises a shared forward fundamental channel and a shared forward supplemental channel.

17. The mobile station of claim 12 wherein the shared forward link channel comprises a shared Walsh code and a shared Public Long Code Mask (PLCM).

18. The mobile station of claim 12 wherein the shared forward link channel comprises at least one of a common time slot and a common frequency.

19. The mobile station of claim 12 wherein the mobile station is further configured to decrypt the PTT statement.

20. The mobile station of claim 12 wherein the mobile station is further configured to:
receive a PTT service parameters message; and
transmit Registration in response to the PTT service parameter message, the shared forward link channel assignment based at least in part on the Registration.

21. A method comprising:
receiving a cellular wireless telephone network PTT session initiation;
identifying a plurality of common PTT session mobile stations in close proximity as a common PTT group in response to the cellular wireless telephone network PTT session initiation;
assigning a shared forward link channel to the common PTT group;
transmitting a PTT statement on the shared channel via the shared forward link channel;
receiving a second PTT statement after the PTT statement transmission;
wherein identifying the plurality of common PTT session mobile stations further comprises re-identifying a second plurality of common PTT session mobile stations as a re-identified common PTT group;
wherein assigning the shared forward link channel comprises assigning a second shared forward link channel to the re-identified common PTT group; and
wherein transmitting the PTT statement comprises transmitting the second PTT statement on the second shared forward link channel.

* * * * *